(12) United States Patent
Okazaki

(10) Patent No.: US 11,720,366 B2
(45) Date of Patent: Aug. 8, 2023

(54) ARITHMETIC PROCESSING APPARATUS USING EITHER SIMPLE OR COMPLEX INSTRUCTION DECODER

(71) Applicant: FUJITSU LIMITED, Kawasaki (JP)

(72) Inventor: Ryohei Okazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 100 days.

(21) Appl. No.: 17/182,328

(22) Filed: Feb. 23, 2021

(65) Prior Publication Data

US 2021/0318854 A1 Oct. 14, 2021

(30) Foreign Application Priority Data

Apr. 10, 2020 (JP) .................................. 2020-071046

(51) Int. Cl.
*G06F 9/38* (2018.01)

(52) U.S. Cl.
CPC .................. *G06F 9/3822* (2013.01)

(58) Field of Classification Search
CPC ... G06F 9/3818; G06F 9/3822; G06F 9/30145
See application file for complete search history.

(56) References Cited

U.S. PATENT DOCUMENTS

| | | | | |
|---|---|---|---|---|
| 4,975,839 A | * | 12/1990 | Nakatsuka | G06F 9/30145 712/E9.028 |
| 5,630,083 A | * | 5/1997 | Carbine | G06F 9/30145 712/E9.072 |
| 5,881,279 A | * | 3/1999 | Lin | G06F 9/268 712/228 |
| 2016/0147538 A1 | * | 5/2016 | Wiencke | G06F 9/30196 712/207 |

FOREIGN PATENT DOCUMENTS

| | | | | |
|---|---|---|---|---|
| EP | 573071 A2 | * | 12/1993 | ......... G06F 9/3017 |
| JP | S64-25240 A | | 1/1989 | |
| JP | H01-320540 A | | 12/1989 | |

* cited by examiner

*Primary Examiner* — Courtney P Carmichael-Moody
(74) *Attorney, Agent, or Firm* — Fujitsu Patent Center

(57) ABSTRACT

An arithmetic processing apparatus includes two instruction decoders. A first decoder processes instructions in a single cycle, while a second decoder processes instructions in a plurality of cycles. The apparatus further includes a determination circuit that causes the first decoder to process an instruction to be processed when the instruction to be processed is a specific instruction and there is no previous instruction being processed, and causes the second decoder to process the instruction to be processed when the instruction to be processed is not the specific instruction or there is a previous instruction being processed.

2 Claims, 7 Drawing Sheets

FIG. 5

| E | PD1 | | | D |
|---|---|---|---|---|
| E | PD1 | PD2 | PD3 | D |

DECODER simple
DECODER complex

ARITHMETIC PROCESSING APPARATUS USING EITHER SIMPLE OR COMPLEX INSTRUCTION DECODER

CROSS-REFERENCE TO RELATED APPLICATION

This application is based upon and claims the benefit of priority of the prior Japanese Patent Application No. 2020-71046, filed on Apr. 10, 2020, the entire contents of which are incorporated herein by reference.

FIELD

The embodiment discussed herein is related to an arithmetic processing apparatus.

BACKGROUND

When decoding an instruction, any instruction may be processed in a fixed number of cycles. In order to decode an instruction of an instruction set architecture of a complex instruction system such as a complex instruction set computer (CISC), a decoding process may be performed in a plurality of cycles.

For example, in micro-op decomposition control, instruction decoding is performed over a plurality of cycles since the processing may not be completed in a single cycle when performing a decoding process of decomposing a complex instruction into a plurality of simple instructions. Related techniques are disclosed in, for example, Japanese Laid-open Patent Publication Nos. 64-25240 and 1-320540.

SUMMARY

According to an aspect of the embodiments, an arithmetic processing apparatus including: a first decoder that processes instructions in a single cycle; a second decoder that processes instructions in a plurality of cycles; and a determination circuit that causes the first decoder to process an instruction to be processed when the instruction to be processed is a specific instruction and there is no previous instruction being processed, and causes the second decoder to process the instruction to be processed when the instruction to be processed is not the specific instruction or there is a previous instruction being processed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a table illustrating pipelines of the instruction decoder illustrated in FIG. 2;

DESCRIPTION OF EMBODIMENTS

Figure 1:
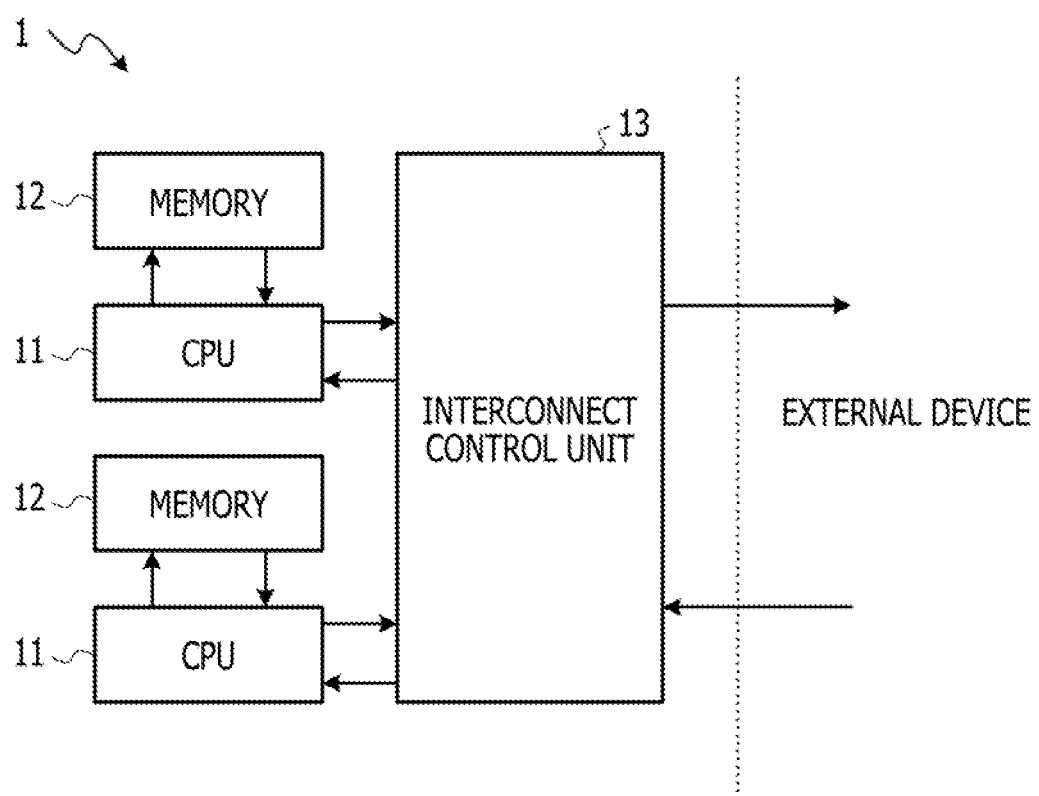
FIG. 1 is a block diagram schematically illustrating a hardware configuration example of an arithmetic processing apparatus according to an example of an embodiment.

As the latency of the instruction decoder is increased, the total number of pipeline stages from instruction fetch to instruction completion (for example, commit) is increased. This means that branch mis-prediction penalty is increased.

As the branch mis-prediction penalty is increased, instructions per dock (IPC) of a processor is reduced, resulting in poor performance.

As a coping method, an instruction decoder capable of decoding a small number of types of instructions with low latency and an instruction decoder capable of decoding all instructions with long latency are prepared. The decoding result of the instruction decoder with long latency is normally adopted. When it is found that an instruction string only has instructions that may be processed by the instruction decoder with low latency, a method of switching to the instruction decoder with low latency is also conceivable.

However, for an instruction string in which instructions that may be and may not be processed by the instruction decoder with low latency are mixed, there is a possibility that the operation may not be dynamically switched while maintaining the pipeline operation of the instruction decoder.

In one aspect, it is an object to reduce an increase in latency of the instruction decoder.

Hereinafter, an embodiment will be described with reference to the drawings. Note that, the following embodiment is merely an example and is not intended to exclude various modification examples and technical applications which are not explicitly described in the embodiment. For example, the present embodiment may be implemented with various modifications without departing from the gist of the present embodiment.

The drawings are not intended to indicate that only the drawn elements are provided, but the embodiment may include other functions and so on.

Since the same reference signs indicate the same components in the drawings, duplicate description thereof will be omitted below.

[A] Example of Embodiment

[A-1] Configuration Example of System

FIG. 1 is a block diagram schematically illustrating a hardware configuration example of an arithmetic processing apparatus 1 according to an example of an embodiment.

The arithmetic processing apparatus 1 includes plural (two in the illustrated example) central processing units (CPUs) 11, plural (two in the illustrated example) memories 12, and an interconnect control unit 13.

The memory 12 is exemplarily a memory apparatus including a read-only memory (ROM) and a random-access memory (RAM). Programs such as a Basic Input/Output System (BIOS) may be written to the ROM of the memory 12. The software programs in the memory 12 may be loaded and executed by the CPU 11 as appropriate. The RAM of the memory 12 may be used as a primary recording memory or a working memory.

The interconnect control unit 13 is an interface for enabling communications with an external apparatus.

Figure 2:
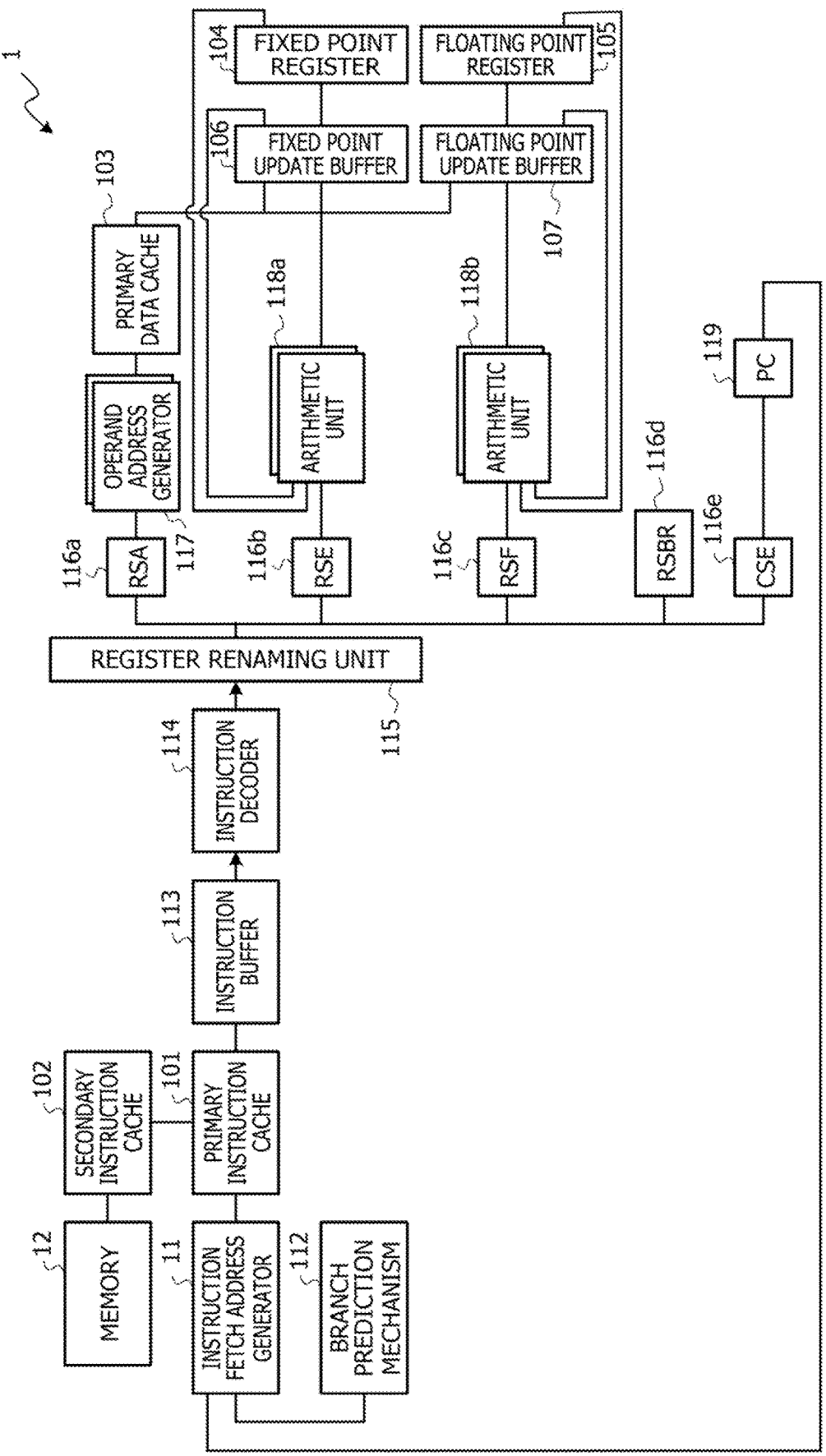
FIG. 2 is a block diagram schematically illustrating a software configuration example of the arithmetic processing apparatus illustrated in FIG. 1.

FIG. 2 is a block diagram schematically illustrating a software configuration example of the arithmetic processing apparatus 1 illustrated in FIG. 1.

As illustrated in FIG. 2, the CPU 11 functions as an instruction fetch address generator 111, a branch prediction mechanism 112, an instruction buffer 113, an instruction decoder 114, and a register renaming unit 115. The CPU 11 also functions as an RSA 116a, an RSE 116b, an RSF 116c, an RSBR 116d, a CSE 116e, an operand address generator 117, arithmetic units 118a and 118b, and a PC 119. The CPU 11 further functions as a primary instruction cache 101, a secondary instruction cache 102, a primary data cache 103, a fixed point register 104, a floating point register 105, a fixed point update buffer 106, and a floating point update buffer 107.

Here, RSA is an abbreviation for a reservation station for address generation, RSE is an abbreviation for a reservation station for execution, and RSF is an abbreviation for a reservation station for floating point. RSBR is an abbreviation for a reservation station for branch, CSE is an abbreviation for a commit stack entry, and PC is an abbreviation for a program counter. The fixed point register may be denoted as a general purpose register (GPR), and the floating point register may be denoted as an FPR.

The instruction fetch address generator 111 generates an instruction fetch address and stores the instruction fetch address in the primary instruction cache 101, the secondary instruction cache 102, or the memory 12.

The branch prediction mechanism 112 predicts a branch in an instruction string to be executed in future.

The instruction buffer 113 temporarily stores instructions fetched from the primary instruction cache 101 in their original order in a program.

The instruction decoder 114 decodes the instructions temporarily stored in the instruction buffer 113.

The register renaming unit 115 determines a physical register to which a computing result is to be written.

Each of the RSA 116a, the RSE 116b, the RSF 116c, and the RSBR 116d is a storage with a queue structure called a reservation station. When the register renaming unit 115 determines the physical register to which a computing result is to be written, the corresponding instruction is accumulated in the reservation station.

The RSA 116a is a reservation station for address calculation of a load-store instruction, and is coupled to the operand address generator 117, the primary data cache 103, and the floating-point register 105 in the subsequent stage.

The RSE 116b is a reservation station for fixed point calculation, and is coupled to the arithmetic unit 118a, the fixed-point update buffer 106, and the fixed-point register 104 in the subsequent stage.

The RSF 116c is a reservation station for floating point calculation, and is coupled to the arithmetic unit 118b, the floating-point update buffer 107, and the floating-point register 105 in the subsequent stage.

The RSBR 116d is a reservation station for a branch instruction.

The instructions decoded by the instruction decoder 114 are assigned instruction identifications (IID) in their original order, and are sent in their original order to a circuit called the CSE 116e that performs a COMMIT process. The CSE 116e is divided into a storage with a queue structure in which decoded instructions are stored in an execution order of the instructions, and a completion processing circuit that performs the COMMIT process based on queue information and a completion report from each processing pipeline. The instructions decoded by the decoder are stored in a queue of the CSE 116e, and each wait for a completion report of instruction processing. A completion report of each of the instructions executed in out-of-order in the reservation stations is sent to the CSE 116e. Among the instructions which are stored in the queue while waiting for the completion reports, the instructions corresponding to the respective completion reports are terminated (committed) in their original execution order in the program by the completion processing circuit of the CSE 116e, and thereby the resources are updated.

The PC 119 is coupled as a subsequent stage to the CSE 116e and coupled as a previous stage to the instruction fetch address generator 111, and notifies the instruction fetch address generator 111 of an address in the memory 12 where an instruction to be executed next is stored, based on a computing result of the CSE 116e.

Figure 3:
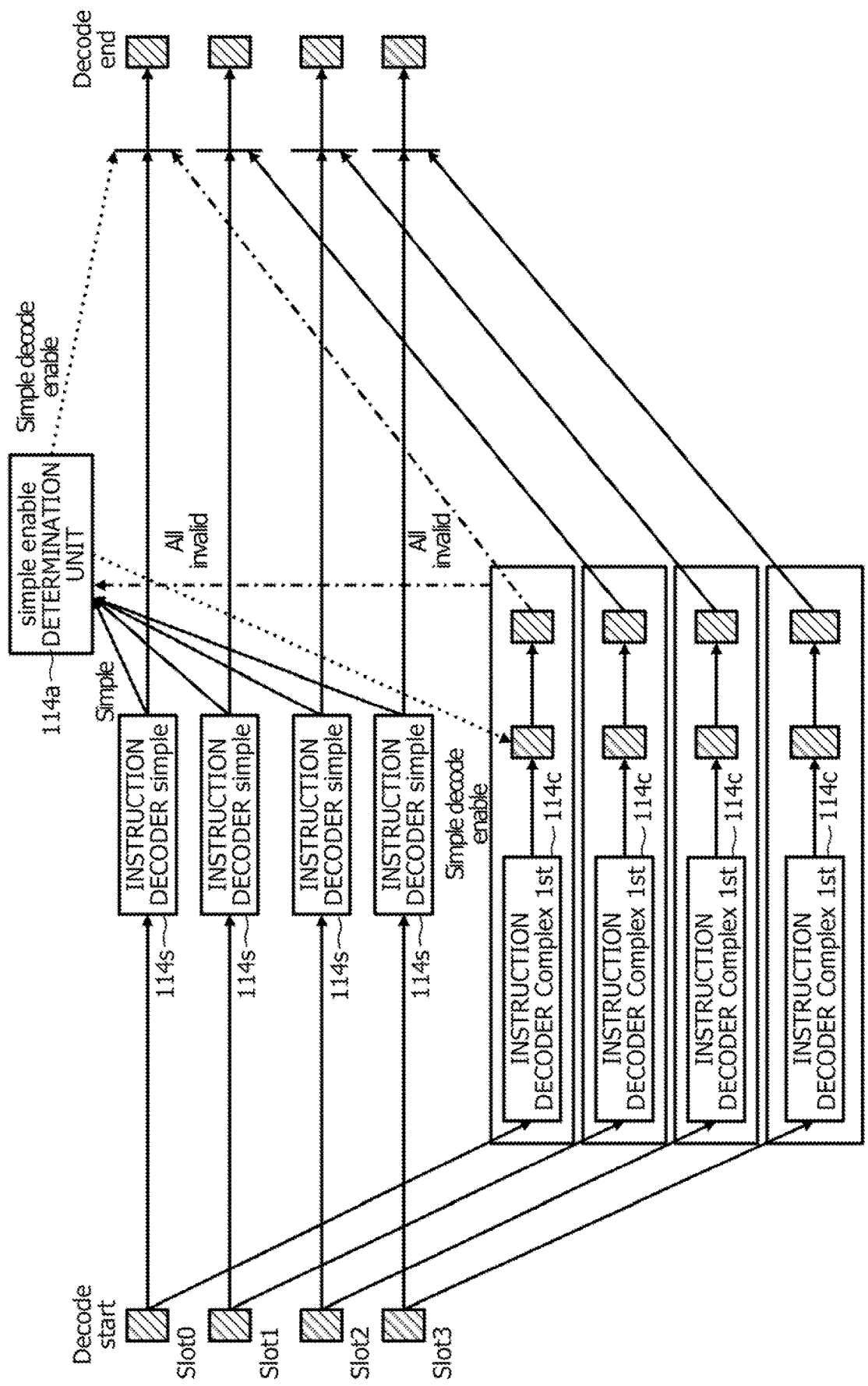
FIG. 3 is a block diagram schematically illustrating a configuration example of an instruction decoder illustrated in FIG. 2.

FIG. 3 is a block diagram schematically illustrating a configuration example of the instruction decoder 114 illustrated in FIG. 2.

In the illustrated example, the number of parallel decodes in a superscalar processor is 4. The instruction decoder 114 is divided into an instruction decoder complex 114c and an instruction decoder simple 114s. The instruction decoder complex is capable of performing complex instruction decoding such as micro-op decomposition. The instruction decoder complex may decode all instructions, but has a decoding latency longer than that of the instruction decoder simple. In the illustrated example, it is assumed that the instruction decoder complex performs decoding over +2 cycles. The instruction decoder simple may only decode simple instructions, but is capable of decoding instructions in one cycle.

When instruction decoding is started, an instruction opcode is passed to both the instruction decoder simple and the instruction decoder complex $1^{st}$ to start the decoding. The instruction decoder complex $1^{st}$ represents processing of the first cycle when the instruction decoder complex performs decoding over three cycles. The processing of the second cycle is represented as complex $2^{nd}$, and the processing of the third cycle is represented as complex $3^{rd}$.

The instruction decoder simple first determines whether or not the instruction may be decoded by the instruction decoder simple. When it is determined that the instruction may be decoded, the flag "simple" is set to "1".

In the same cycle, when simple enable=1 in all slots, there is no instruction being decoded in the instruction decoder complex (for example, all invalid), and an instruction may be inputted to FF of Decode end, a simple enable determination unit 114a outputs a flag "Simple decode enable" set to "1".

The reason for checking All invalid is that when there is an instruction in the instruction decoder complex, that instruction comes first in the instruction order, and thus is not to be overtaken.

When Simple decode enable="1", the instruction is not moved from FF of decode start to FF of the first stage of the instruction decoder complex. Instead, the instruction is moved directly from FF of decode start to FF of decode end.

Each cycle of each slot has a flag "valid", and the flag "1" represents a valid instruction. The movement of instructions is also the movement of valid.

The instruction inputted to FF of Decode end is the result of selecting either the output from the instruction decoder simple or the output from the instruction decoder complex, and if Simple decode enable="1", the instruction decoder simple side is selected. A multiplexer (MUX) circuit may be used, for example, to select the output.

When Simple decode enable="1", the movement of the instruction is deterred by deterring the movement of valid to the complex $1^{st}$ cycle of the instruction decoder complex.

As described above, when there is no instruction in the instruction decoder complex, a simple instruction may be decoded with a short latency through the instruction decoder simple. Even when an instruction string has instructions mixed therein that may not be processed by the instruction decoder simple, the instruction decoding may be pipelined while maintaining the correct instruction processing order through arbitration by the instruction decoder complex and the simple enable determination unit 114a.

When the instruction string has only instructions that may be processed by the instruction decoder simple, the instructions may be decoded mostly with a short latency unless no instructions may be issued from decode end.

Figure 4:
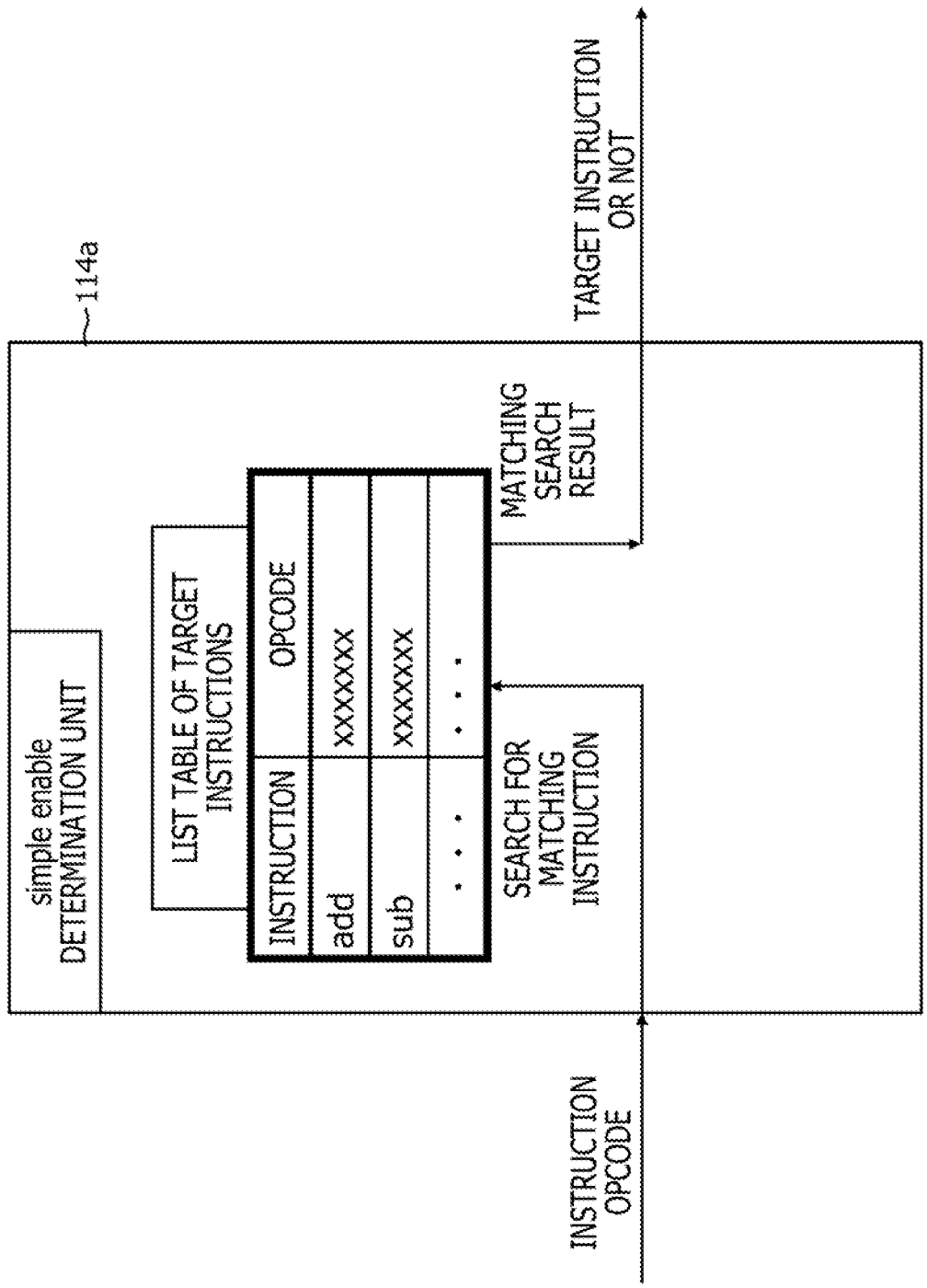
FIG. 4 is a diagram illustrating determination processing of a target instruction by a simple enable determination unit illustrated in FIG. 3.

FIG. 4 is a diagram illustrating determination processing of a target instruction by the simple enable determination unit 114a illustrated in FIG. 3.

An instruction opcode may be used as an input to uniquely determine whether or not a certain instruction is to be processed by the instruction decoder simple. For example, as illustrated in FIG. 4, a list table of target instructions may be defined in advance to check if the instruction corresponds to the list table.

Simple instructions such as add may be generally decoded with low latency, and thus are to be processed by the instruction decoder simple. On the other hand, an instruction that has to be divided into a plurality of flows through complicated processing is not to be processed by the instruction decoder simple, since decoding is also performed with long latency.

When the instruction is to be processed by the instruction decoder simple, it is determined whether or not there is an instruction being decoded by the instruction decoder 114 with normal latency. Even when the instruction is the previous instruction in the issuance order, the instruction decoder 114 with normal latency has a longer latency, and therefore, there is a possibility that the decoding has not been completed.

Since the instruction decoding is performed in-order, it is checked if there is no instruction being decoded. These determinations are made by the simple enable determination unit 114a based on reports from low latency decoding (for example, the instruction decoder simple) and normal latency decoding (for example, the instruction decoder complex).

When there is no instruction being decoded, the instruction decoding with normal latency that has been executed in parallel is canceled. The decoding is completed using the result of decoding by the instruction decoder simple with low latency.

When the instruction is not the target of decoding with low latency or when there is a previous instruction in the decoding with normal latency, the decoding result obtained by the decoding process with low latency is discarded, and an output result is obtained by waiting for the decoding result from the instruction decoder complex.

For example, the instruction decoder simple is an example of a first decoder that processes instructions in a single cycle. The instruction decoder complex is an example of a second decoder that processes instructions in a plurality of cycles.

The simple enable determination unit 114a determines that the instruction decoder simple processes the instruction to be processed when the instruction to be processed is a specific instruction and there is no previous instruction being processed. The simple enable determination unit 114a also determines that the instruction decoder complex processes the instruction to be processed when the instruction to be processed is not the specific instruction or there is a previous instruction being processed.

The simple enable determination unit 114a may determine a specific instruction based on the inputted instruction opcode.

FIG. 5 is a table illustrating pipelines of the instruction decoder 114 illustrated in FIG. 2.

Pipeline stages are named E, PD1, PD2, PD3, and D, respectively.

E is a cycle in which an instruction is passed from the instruction buffer 113 to the decoder, and is common to both of the decoders simple and complex. Each decodes in PD1 cycle, and the simple side reports to the simple enable determination unit 114a whether the instruction may be processed by the instruction decoder simple. The complex side checks if there is a valid instruction in PD2 and PD3, and reports to the simple enable determination unit 114a. From such information, the simple enable determination unit 114a determines Simple decode enable and outputs a signal in PD1 cycle.

Figure 6:
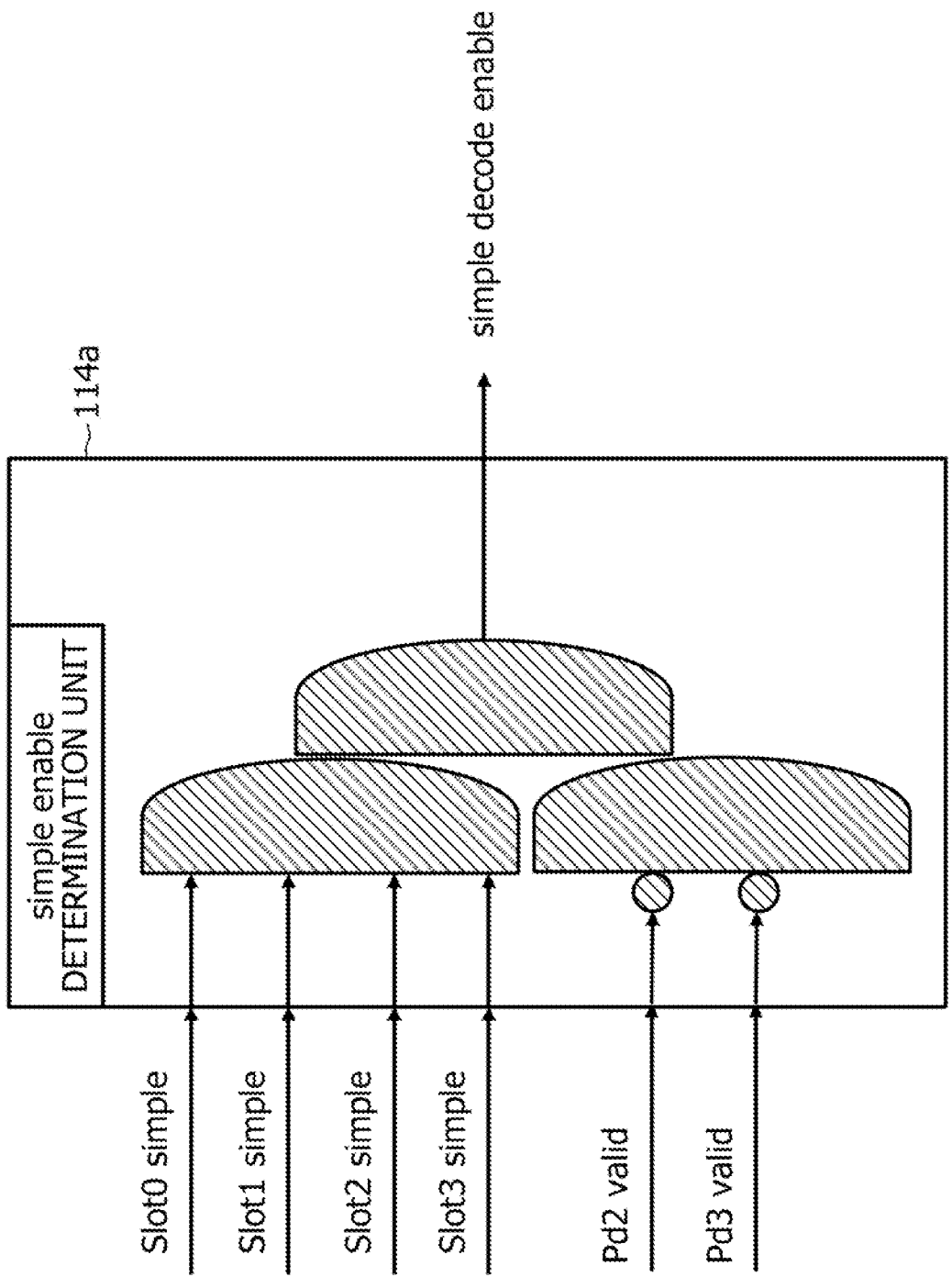
FIG. 6 is a diagram illustrating a logic circuit of the simple enable determination unit illustrated in FIG. 3.

FIG. 6 is a diagram illustrating a logic circuit of the simple enable determination unit 114a illustrated in FIG. 3.

The simple enable determination unit 114a receives information indicating whether or not the instruction is a target instruction acquired from the instruction decoder simple corresponding to each slot (Slot0 to Slot3), and information on whether or not an instruction exists in each cycle of Pd2 and Pd3. The simple enable determination unit 114a enables Simple decode enable when "simple" of every slot Slot0 to Slot3 is 1 and valid=off for Pd2 and Pd3.

[A-2] Operation Example

Figure 7:
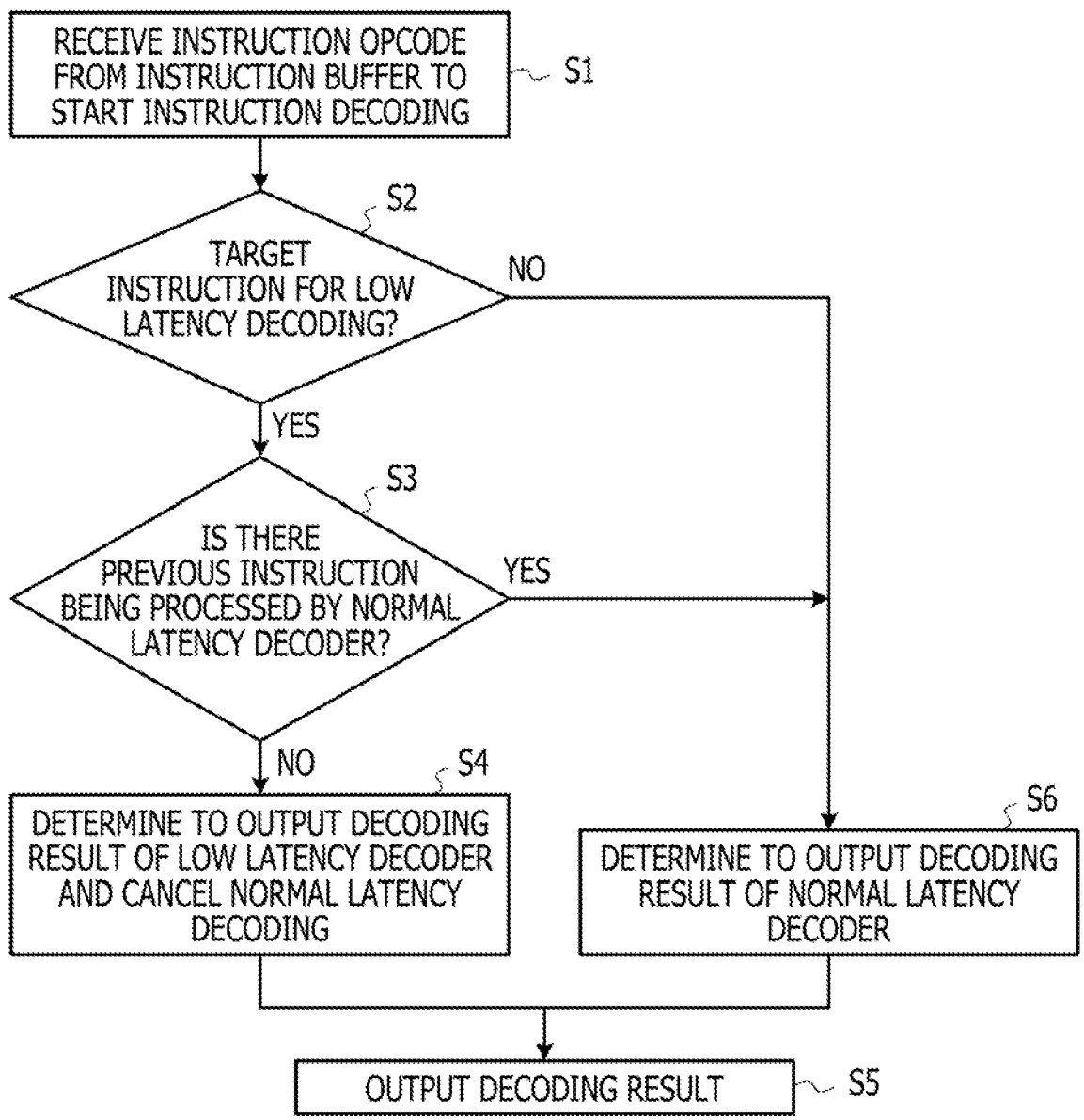
FIG. 7 is a flowchart for explaining determination processing of a target instruction in the arithmetic processing apparatus illustrated in FIG. 1.

The determination processing of the target instruction in the arithmetic processing apparatus 1 illustrated in FIG. 1 will be described with reference to a flowchart (steps S1 to S6) illustrated in FIG. 7.

The instruction decoder 114 receives an instruction opcode from the instruction buffer 113, and starts the code with an instruction (step S1).

The simple enable determination unit 114a determines whether or not the instruction is a target instruction for low latency decoding (step S2).

When the instruction is not the target instruction for low latency decoding (see NO route in step S2), the processing proceeds to step S6.

On the other hand, when the instruction is the target instruction for low latency decoding (see YES route in step S2), the simple enable determination unit 114a determines whether or not there is a previous instruction being processed by the instruction decoder complex with normal latency (step S3).

When there is a previous instruction being processed by the instruction decoder complex with normal latency (see YES route in step S3), the processing proceeds to step S6.

When there is no previous instruction being processed by the instruction decoder complex with normal latency (see NO route in step S3), the instruction decoder 114 determines to output the decoding result of the instruction decoder simple with low latency. The instruction decoder 114 then cancels the decoding by the instruction decoder complex with normal latency (step S4).

The instruction decoder 114 outputs the decoding result (step S5) and terminates the determination processing of the target instruction.

When the instruction is not the target instruction for low latency decoding in step S2 (see NO route in step S2) or when there is a previous instruction being processed by the instruction decoder complex with normal latency in step S3 (see YES route in step S3), the processing proceeds to step S6 as described above. The instruction decoder 114 determines to output the decoding result of the instruction decoder complex with normal latency (step S6). The processing then proceeds to step S5.

[A-3] Effects

With the arithmetic processing apparatus 1 in the example of the embodiment described above, for example, the following effects may be obtained.

The instruction decoder simple processes instructions in a single cycle. The instruction decoder complex processes instructions in a plurality of cycles. The simple enable determination unit 114a determines that the instruction decoder simple processes the instruction to be processed when the instruction to be processed is a specific instruction and there is no previous instruction being processed. The simple enable determination unit 114a also determines that the instruction decoder complex processes the instruction to be processed when the instruction to be processed is not the specific instruction or there is a previous instruction being processed.

As a result, it is possible to suppress an increase in latency of the instruction decoder 114 by causing the instruction decoder 114 with as low latency as possible to execute a simple instruction. The total number of pipeline stages may be reduced, and substantial branch mis-prediction penalty may be reduced.

The simple enable determination unit 114a determines a specific instruction based on an inputted instruction opcode. Thus, a simple specific instruction such as add may be easily determined and set as a processing target candidate for the instruction decoder simple.

[B] Others

The disclosed technique is not limited to the above-described embodiment but may be carried out with various modifications without departing from the gist of the present embodiment. Each configuration and each process of the present embodiment may be selected as desired or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus comprising:
   a first decoder that processes instructions in a single cycle;
   a second decoder that processes instructions in a plurality of cycles; and
   a determination circuit that causes the first decoder to process an instruction to be processed in a case where the instruction to be processed is a specific instruction and there is no previous instruction being processed in the second decoder, and causes the second decoder to process the instruction to be processed in a case where the instruction to be processed is not the specific instruction and in a case where the instruction to be processed is the specific instruction and there is a previous instruction being processed in the second decoder.

2. The arithmetic processing apparatus according to claim 1, wherein the determination circuit determines the specific instruction based on an inputted instruction opcode.

* * * * *